United States Patent
Nicholas et al.

(10) Patent No.: US 9,488,231 B2
(45) Date of Patent: Nov. 8, 2016

(54) COOLING ASSEMBLY AND METHOD FOR PROVIDING COOLING AIR FLOW IN REGION OF CONSTANT VELOCITY JOINT

(71) Applicant: Ford Global Technologies, LLC, Dearborn, MI (US)

(72) Inventors: Chris Peter Nicholas, Milford, MI (US); Scott Wilson, Lexington, MI (US); John Robert Saieg, Wixom, MI (US); Brian Brown, Clinton Township, MI (US); Duane Allan Lewis, Westland, MI (US); Tony Paskus, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 342 days.

(21) Appl. No.: 14/226,068

(22) Filed: Mar. 26, 2014

(65) Prior Publication Data
US 2015/0275979 A1 Oct. 1, 2015

(51) Int. Cl.
| *F25B 45/00* | (2006.01) |
| *F16D 3/02* | (2006.01) |
| *B60K 11/06* | (2006.01) |
| *B60K 17/22* | (2006.01) |

(52) U.S. Cl.
CPC ............. *F16D 3/02* (2013.01); *B60K 11/06* (2013.01); *B60K 17/22* (2013.01); *Y10T 464/10* (2015.01)

(58) Field of Classification Search
CPC ........... F16D 3/16; F16D 3/00; B60K 17/22; Y10T 464/10; Y10S 464/904; Y10S 464/905
USPC .................................................. 464/17, 168
See application file for complete search history.

(56) References Cited

U.S. PATENT DOCUMENTS

| 1,582,284 | A | 9/1923 | Leipert |
| 4,410,311 | A | 10/1983 | Hennessy |
| 6,042,479 | A | 3/2000 | Hopson et al. |
| 8,083,595 | B2 | 12/2011 | Sanchez et al. |
| 2014/0090917 | A1* | 4/2014 | Despres-Nadeau ...... B60K 5/02 180/233 |

FOREIGN PATENT DOCUMENTS

| DE | 3025731 | 12/1982 |
| JP | 5888017 | 6/1983 |
| JP | 59147923 | 10/1984 |
| JP | 2002087012 | 3/2002 |
| JP | 2005172110 | 6/2005 |
| JP | 2007247860 | 9/2007 |

(Continued)

*Primary Examiner* — Len Tran
*Assistant Examiner* — Ana Vazquez
(74) *Attorney, Agent, or Firm* — Diederiks & Whitelaw, PLC

(57) ABSTRACT

A cooling apparatus and method for providing a cooling air flow in a region of a constant velocity joint. The constant velocity joint has a housing comprising a first housing portion and a second housing portion. The first and second housing portions are coupled together by fasteners. The cooling device comprises a load-distributing portion and a fan-blade portion. The load-distributing portion is located between a head of each fastener and either the first or second housing portion, with each fastener inserted into a respective hole in the load-distributing portion. The load-distributing portion distributes a load applied by the fasteners to the first or second housing portion. The fan-blade portion is coupled to the load-distributing portion. The fan-blade portion is configured to create a current of air when the constant velocity joint housing rotates.

21 Claims, 11 Drawing Sheets

(56) References Cited

FOREIGN PATENT DOCUMENTS

| JP | 2009103216 | 5/2009 |
| JP | 2012251652 | 12/2012 |
| KR | 20020087718 | 11/2002 |
| KR | 20030030309 | 4/2003 |
| KR | 20050100741 | 10/2005 |
| KR | 100834220 | 5/2008 |

* cited by examiner

COOLING ASSEMBLY AND METHOD FOR PROVIDING COOLING AIR FLOW IN REGION OF CONSTANT VELOCITY JOINT

BACKGROUND OF THE INVENTION

The present invention pertains to cooling vehicle components and, more particularly, to coupling a fan to a housing for a constant velocity joint to provide cooling along a driveline of a vehicle.

In a motor vehicle, various driveshafts are used to transmit power from a power source, such as an internal combustion engine or electric motor, to the vehicle's wheels. A driveshaft typically includes constant velocity joints, which allow for angular misalignment and, in some cases, axial displacement between the driveshaft and an object to which it is coupled, such as other driveshafts, a transmission, a transfer case, a differential assembly or a wheel hub.

During operation of the vehicle, various driveline components can generate a significant amount of heat. This is especially problematic when the driveline components are located in a compact space. The heat can reduce the lifespan of those components, as well as other nearby components. In some cases, the heat even leads to outright failure of the component. As a result, it is advantageous to provide cooling to certain portions of the driveline. However, space, assembly and cost concerns make it difficult to cool certain areas and components.

Based on the above, there exists a need in the art for a way to cool driveline components that is efficient in terms of space, assembly time and cost.

SUMMARY OF THE INVENTION

The present invention is directed to a cooling assembly and method for providing a cooling air flow in a region of a constant velocity joint. The constant velocity joint has a housing comprising a first housing portion and a second housing portion. The first and second housing portions are coupled together by fasteners. A cooling device comprises a load-distributing portion and a fan-blade portion. The load-distributing portion is located between a head of each fastener and either the first or second housing portion, with each fastener being inserted into a respective hole in the load-distributing portion. The load-distributing portion distributes a load applied by the fasteners to the first or second housing portion. The fan-blade portion is coupled to the load-distributing portion and is configured to create a current of air when the constant velocity joint housing rotates.

In one preferred embodiment, more than one cooling device is coupled to the constant velocity joint housing. In another preferred embodiment, the fan-blade portion includes more than one fan blade. In a still further preferred embodiment, the fan-blade portion is formed integral with the load-distributing portion.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
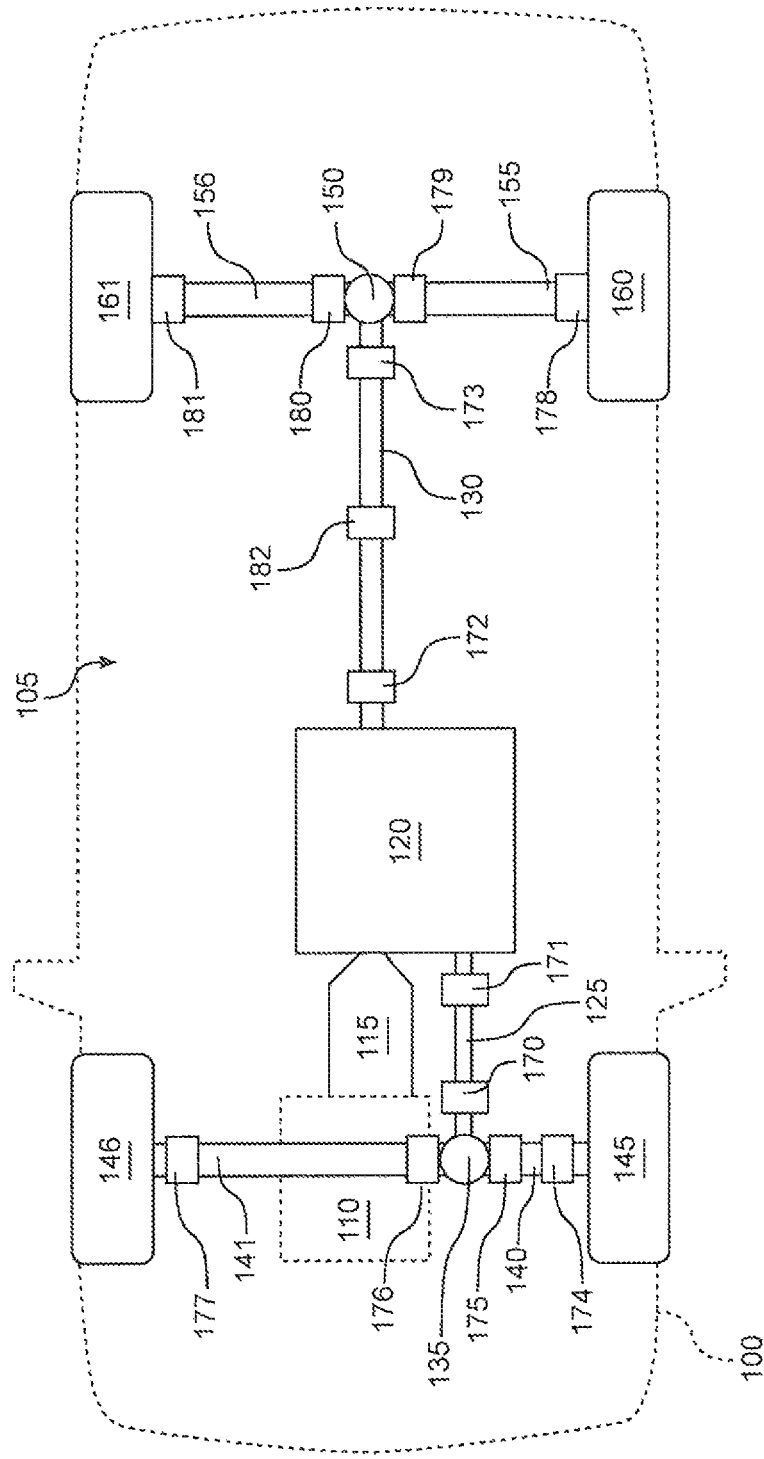
FIG. 1 is a schematic view of a vehicle driveline including constant velocity joints provided with a cooling system in accordance with the present invention.

With initial reference to FIG. 1, there is shown a vehicle 100 with a driveline 105 that includes a power source 110, such as an internal combustion engine or an electric motor, which is connected to a transmission 115 and a transfer case 120. Transfer case 120 has a front driveshaft 125 and a rear driveshaft 130 extending therefrom. Front driveshaft 125 connects to a front differential assembly 135 which, in turn, connects to front half shafts 140, 141. Front wheels 145, 146 are connected to the other ends of half shafts 140, 141. Rear driveshaft 130 connects to a rear differential assembly 150 which, in turn, connects to rear half shafts 155, 156. Rear wheels 160, 161 are connected to the other ends of half shafts 155, 156. These various connections enable power to be transmitted from power source 110 to front wheels 145, 146 and rear wheels 160, 161.

A plurality of constant velocity joints, and associated housings, is provided in driveline 105. The plurality of constant velocity joints enables power to be transmitted from power source 110 to front wheels 145, 146 and rear wheels 160, 161 even if the components of driveline 105 change angles due to steering, driveline windup, suspension jounce and rebound, or the like. One or more of the plurality of constant velocity joints has a cooling system coupled thereto in accordance with the present invention, as described below. In FIG. 1, the plurality of constant velocity joints is located at each end of front driveshaft 125 (constant velocity joints 170, 171), rear driveshaft 130 (constant velocity joints 172, 173), front half shafts 140, 141 (constant velocity joints 174, 175, 176, 177) and rear half shafts 155, 156 (constant velocity joints 178, 179, 180, 181). There is also a constant velocity joint 182 in a central portion of rear driveshaft 130. Similarly, in another embodiment (not shown), a constant velocity joint is provided in a central portion of front driveshaft 125. The plurality of constant velocity joints is of any of the standard types known in the art, such as plunging tripod, Cardan, cross groove, fixed ball, fixed tripod, double offset, or any combination of these, all of which are commonly known terms in the art for different varieties of constant velocity joints.

In FIG. 1, vehicle 100 is a four-wheel drive vehicle. However, it should be noted that the present invention is not limited to use with a four-wheel drive vehicle. Therefore, the present invention is also usable in front-wheel and rear-wheel drive vehicles. Instead, FIG. 1 and the above discussion are provided to show the various locations where constant velocity joints are commonly used in a motor vehicle.

Figure 2:
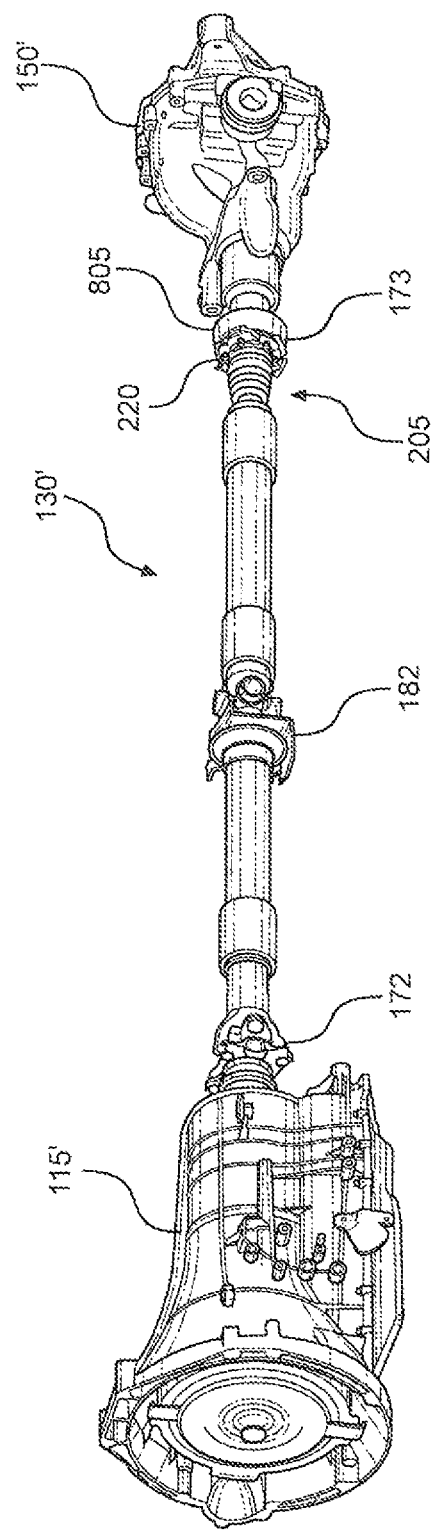
FIG. 2 is perspective view of a portion of a vehicle driveline including a constant velocity joint having a cooling system in accordance with a first embodiment of the present invention.

With reference to FIG. 2, there is shown a rear driveshaft 130' in accordance with an alternate embodiment of driveline 105. Rear driveshaft 130' is connected to transmission 115' at one end and rear differential assembly 150' at the other end. Additionally, rear driveshaft 130' has constant velocity joints 172, 173, 182 with which the present invention can be used. However, rear driveshaft 130' is merely representative. The present invention can be used with any of front driveshaft 125, rear driveshaft 130, front half shafts 140, 141, rear half shafts 155, 156 or any other driveshaft typically found in a motor vehicle. Similarly, each of the plurality of constant velocity joints can be located at any of the positions indicated with respect to FIGS. 1 and 2, as well as any other position where a constant velocity joint is typically found in a motor vehicle.

Figure 3A:
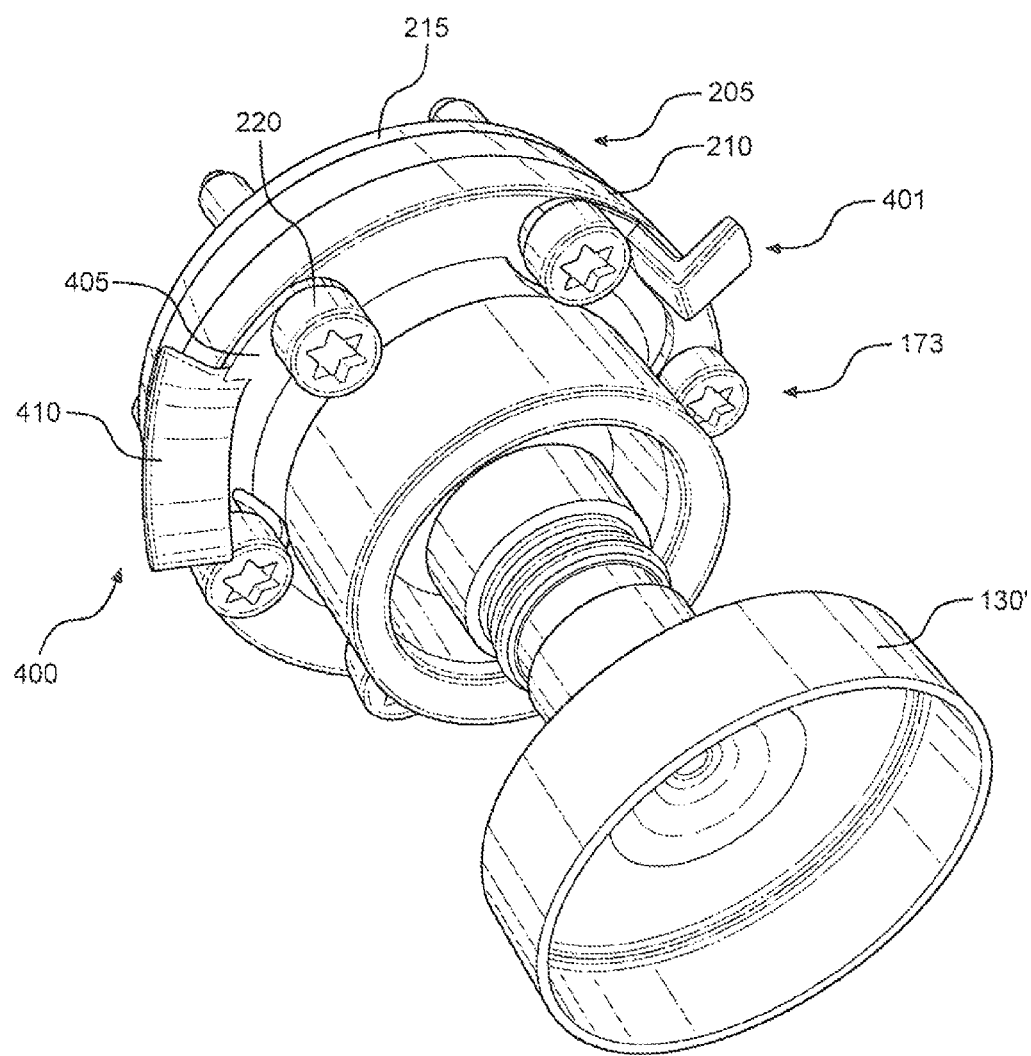
FIGS. 3A-E are perspective views of a cooling system in accordance with the first embodiment of the present invention.
Figure 3B:
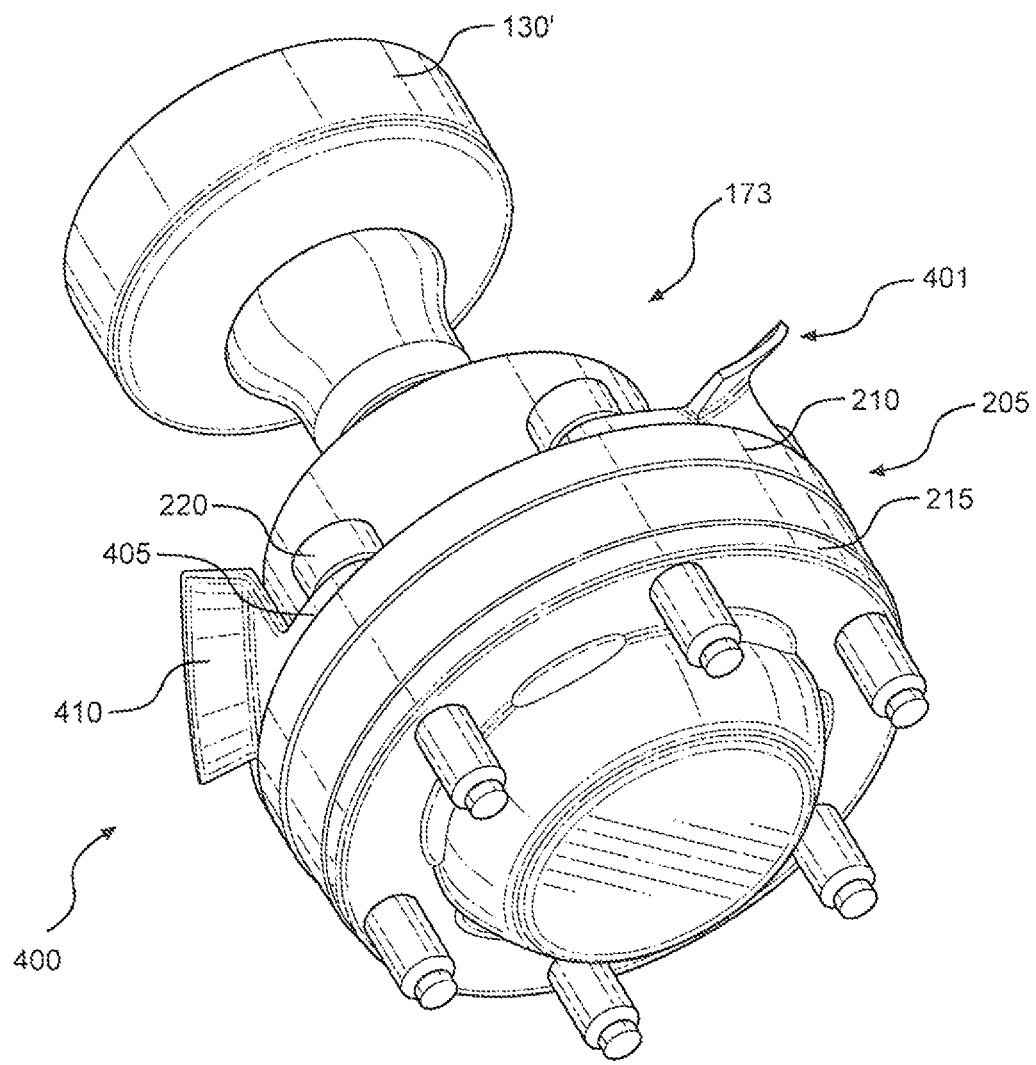

In general, and as best shown in FIGS. 3A-B, constant velocity joint 173 includes a constant velocity joint housing 205 having a first housing portion 210 and a second housing portion 215, the joint itself being located within housing 205. First and second housing portions 210, 215 are coupled by at least one fastener 220. In particular, FIGS. 3A-B show a plurality of fasteners 220 which, in this embodiment, are constituted by bolts. However, any suitable fastener known in the art may be used. In use, constant velocity joint housing 205 is coupled to rear driveshaft 130' at one end and a second rotatable element (which is axle flange 805 in FIG. 2) at the other end. Axle flange 805 is itself coupled to a portion of rear differential assembly 150'. As a result, rotation of rear driveshaft 130' is transmitted to rear differential assembly 150' through axle flange 805. The constant velocity joint inside housing 205 allows rear driveshaft 130' and axle flange 805 to shift angular and axial positions while still transmitting rotational motion. As mentioned above, in other embodiments, the second rotatable element is another driveshaft, a wheel hub or a portion of a transmission, transfer case or differential assembly, for example.

Figure 3C:
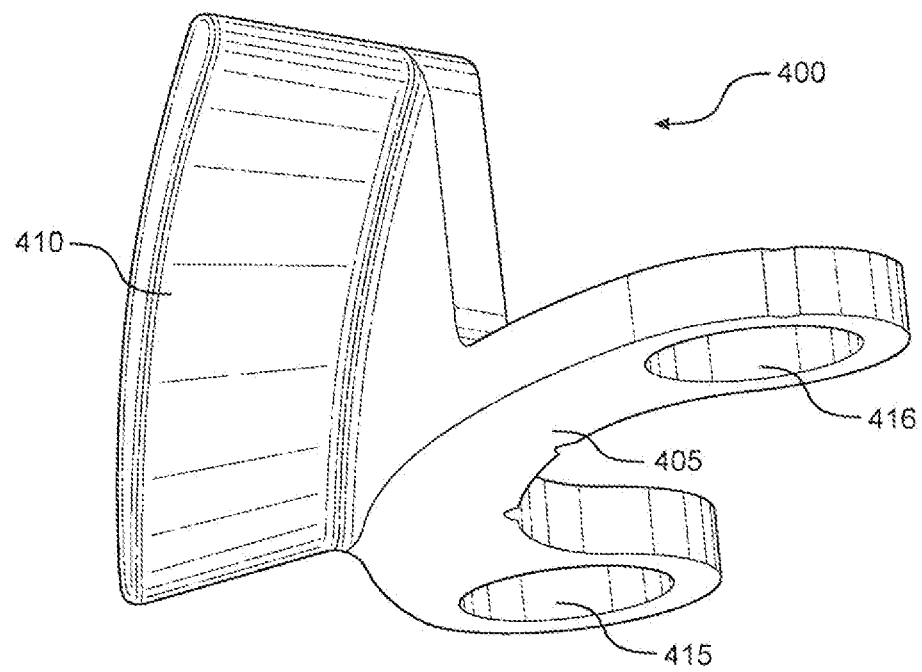
Figure 3D:
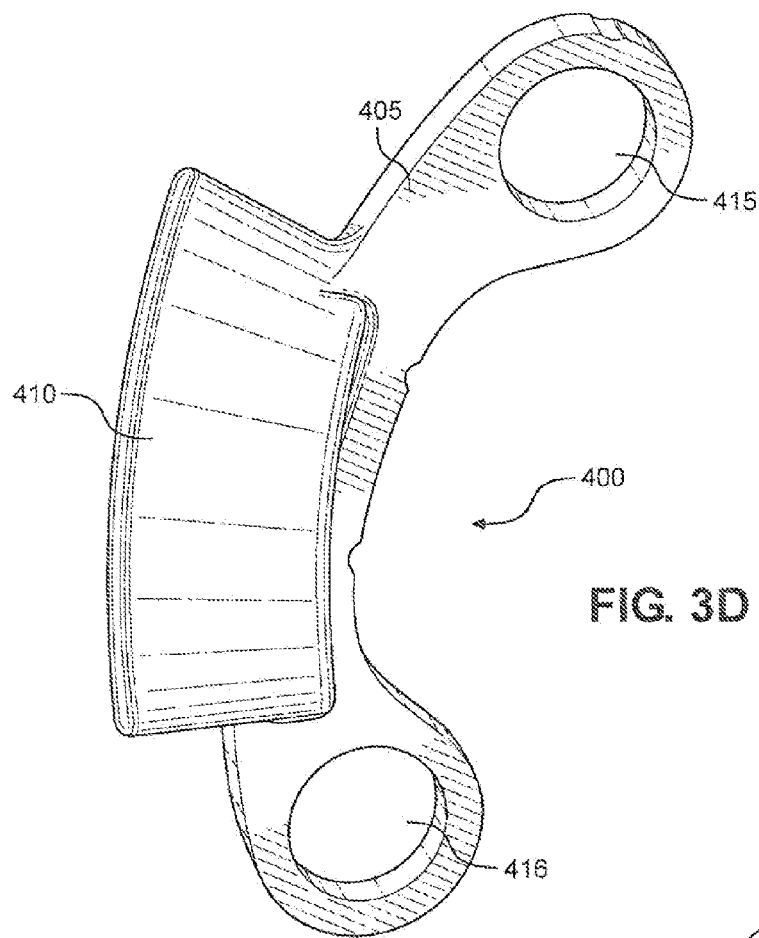

With further reference to FIGS. 3A-E, there is shown a first embodiment of a cooling device 400 for use with a constant velocity joint housing, such as constant velocity joint housing 205. Cooling device 400 generally comprises a load-distributing portion 405 and a fan-blade portion 410, which are preferably formed integrally with one another. Load-distributing portion 405 includes at least one mounting hole 415, with two mounting holes 415, 416 being provided in this embodiment as shown in FIGS. 3C-D.

In FIGS. 3A-B, two cooling devices 400, 401 can be seen coupled to constant velocity joint housing 205. In particular, load-distributing portion 405 of cooling device 400 is positioned between fasteners 220 and first housing portion 210, with fasteners 220 inserted into mounting holes 415, 416 of load-distributing portion 405 to securely couple cooling device 400 to constant velocity joint 205. Load-distributing portion 405 distributes loads applied by fasteners 220 to first housing portion 210. This prevents damage to areas of first housing portion 210 located directly below fasteners 220, such damage being caused by applying a large load to a small area. Instead, load-distributing portion 405 functions similarly to a washer in that load-distributing portion 405 spread loads applied by fasteners 220 over a greater area, thereby reducing the likelihood of damaging the areas of first housing portion 210 located directly below fasteners 220.

Fan-blade portion 410 of cooling device 400 generates air currents when constant velocity joint housing 205 rotates. In a preferred embodiment, cooling device 400 is used in connection with constant velocity joints 170, 171 located on front driveshaft 125 or constant velocity joints 172, 173, 182 located on rear driveshaft 130. Accordingly, fan-blade portion 410 generates air currents when power is transmitted from transfer case 120 to front differential assembly 135 (through front driveshaft 125) or rear differential assembly 150 (through rear driveshaft 130). Rotation of constant velocity joint housing 205 results in movement, about a circular path, of cooling device 400 coupled thereto. As a result of such movement, fan-blade portion 410 generates air currents in a direction that depends on the direction in which constant velocity joint housing 205 rotates. When viewed as shown in FIG. 3A, clockwise rotation of constant velocity joint housing 205 will result in an air current that moves from constant velocity joint housing 205 toward rear driveshaft 130'. Counterclockwise rotation of constant velocity joint housing 205 will result in an air current that moves away from rear driveshaft 130'. The air current generated by the movement of fan-blade portion 410 is used to cool various areas of driveline 105 depending on which of the plurality of constant velocity joints, shown in FIG. 1, cooling device 400 is coupled. For example, the cooling can be applied to a constant velocity joint itself, a tunnel in which a portion of driveline 105 is located or any of the various driveshafts, as well as other nearby components.

Figure 3E:
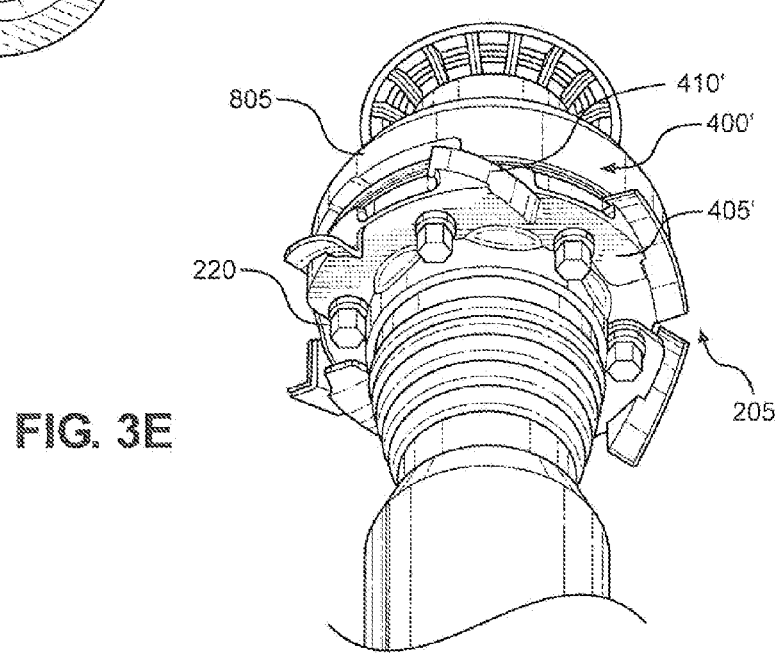

In FIG. 3E, there is shown a variation of the first embodiment of a cooling device 400' in accordance with the present invention. Cooling device 400' is similar to cooling device 400, except that cooling device 400' has more than one fan-blade portion 410' while cooling device 400 has single fan-blade portion 410. Additionally, load-distributing portion 405' has three mounting holes for receiving fasteners 220, in contrast with cooling device 400 which has two mounting holes 415, 416.

Figure 4A:
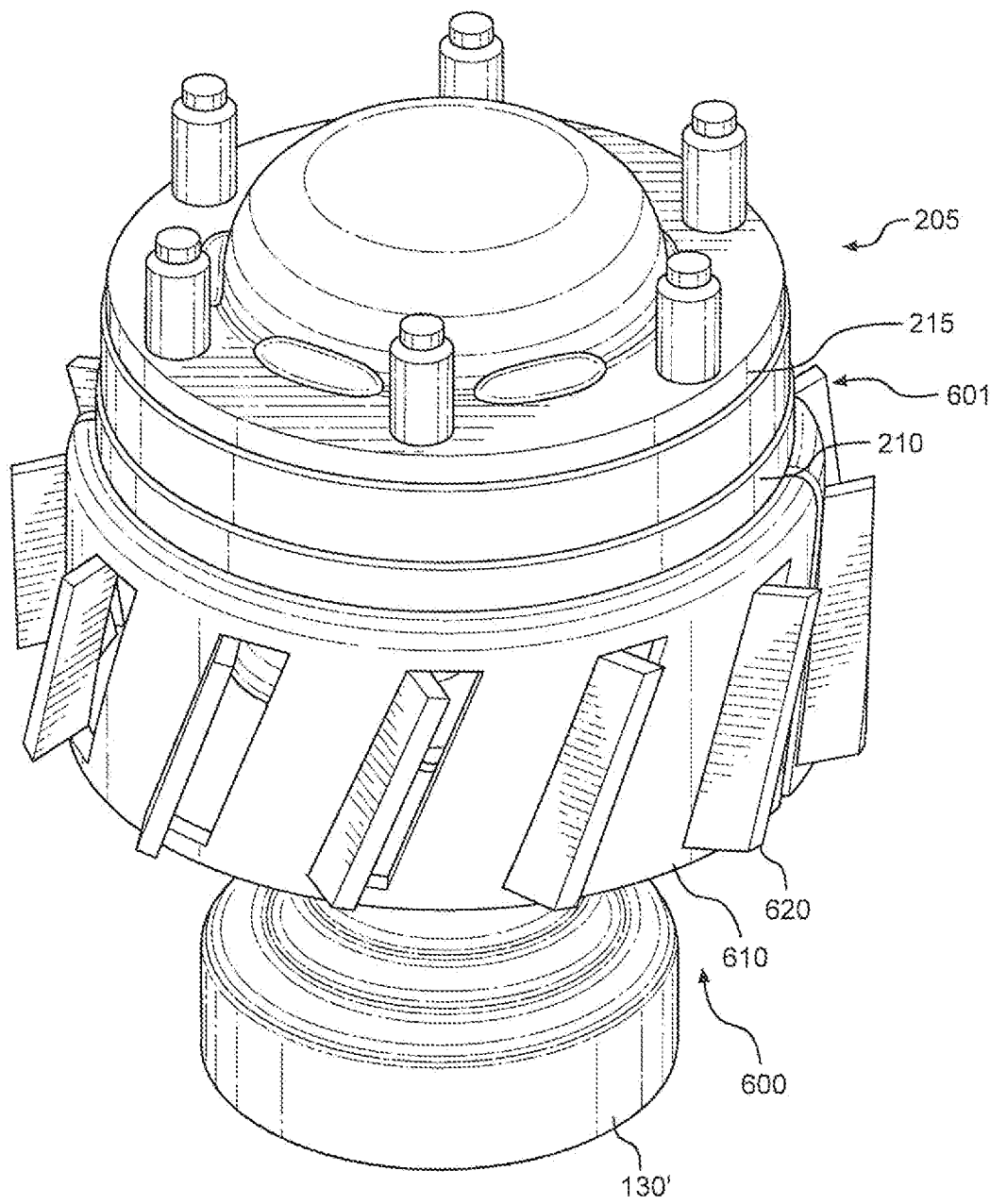
FIGS. 4A-C are perspective views of a cooling system in accordance with a second embodiment of the present invention.
Figure 4B:
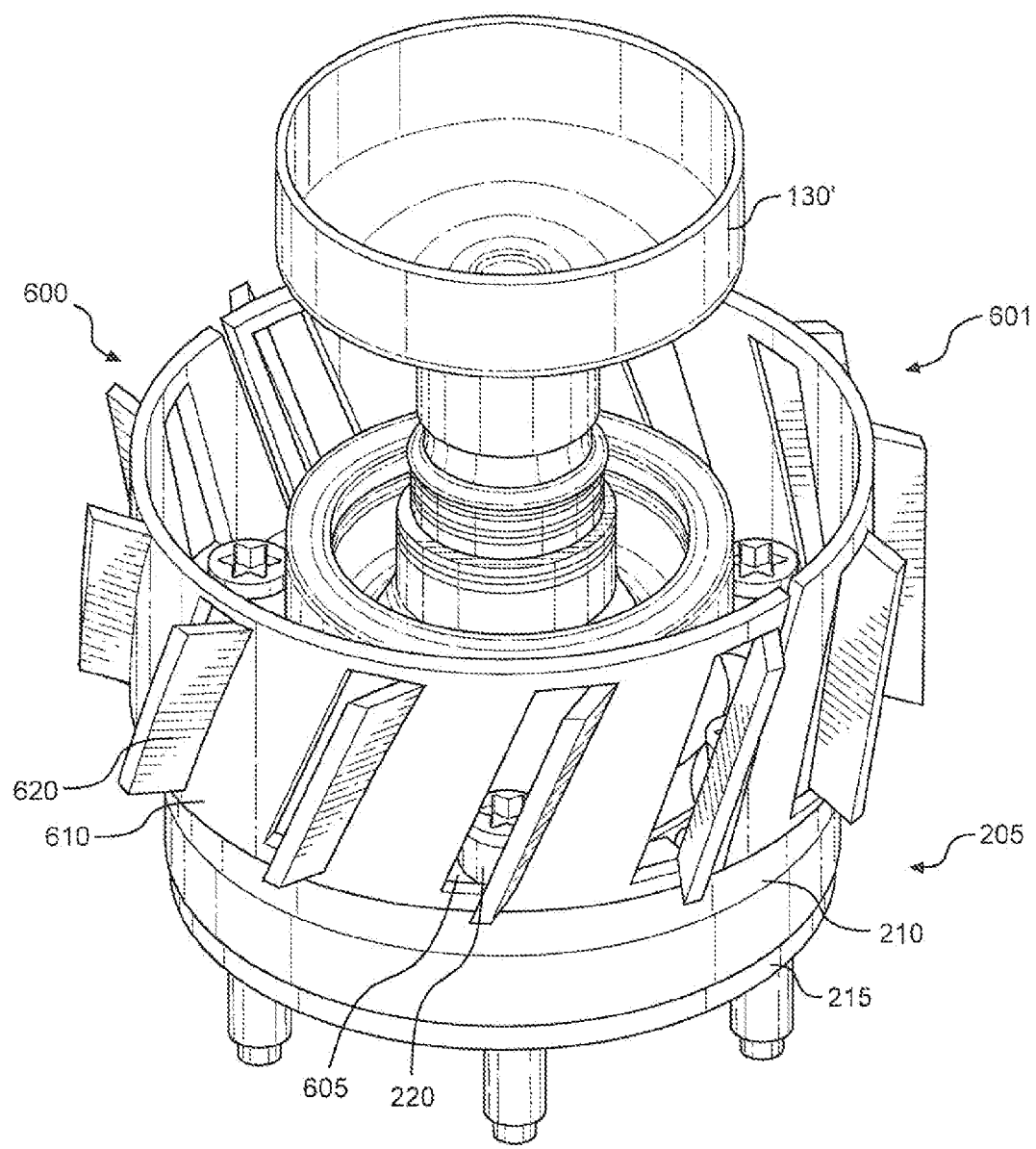
Figure 4C:
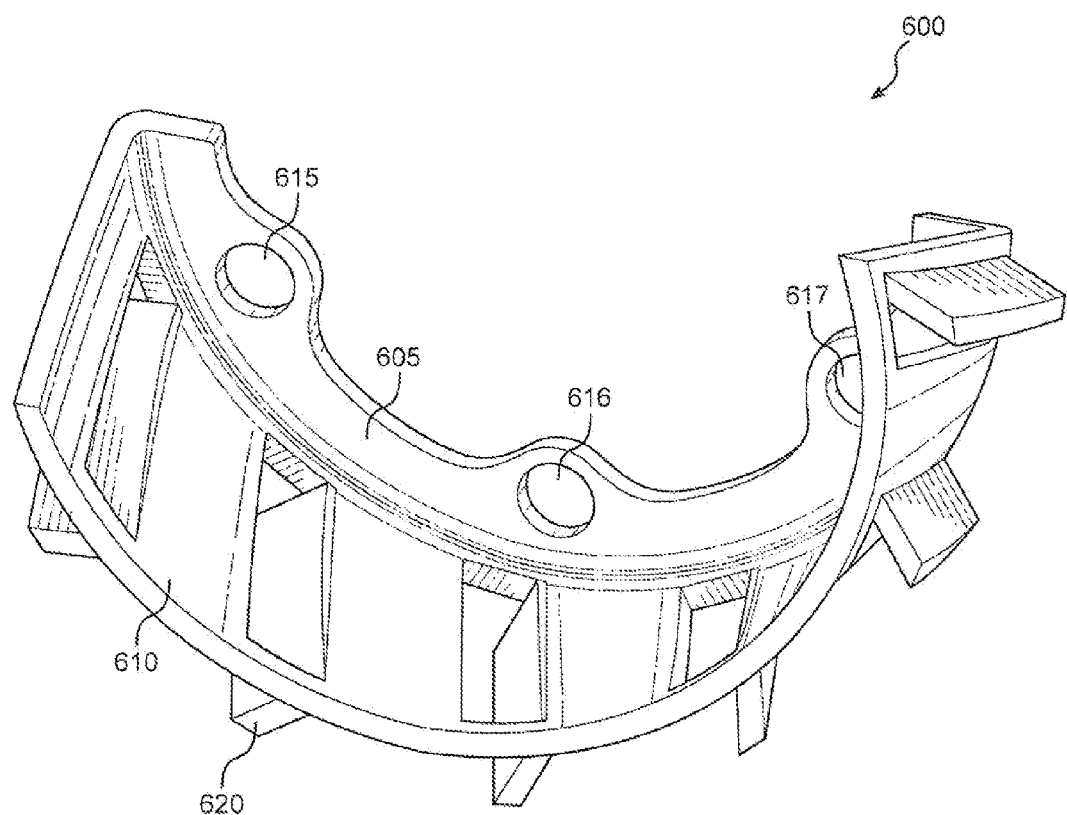

FIGS. 4A-C show a second embodiment of a cooling system in accordance with the present invention. In this embodiment, cooling device 600 again comprises a load-distributing portion 605 and a fan-blade portion 610. As in the first two embodiments, load-distributing portion 605 includes at least one mounting hole 615. Specifically, the embodiment shown in FIGS. 4A-C includes three mounting holes 615, 616, 617. However, in contrast to the first two embodiments, fan-blade portion 610 now has a plurality of fan blades 620.

With reference to FIGS. 4A-B, two cooling devices 600, 601 are shown coupled to constant velocity joint housing 205. In combination, two cooling devices 600, 601 form a full circle. Such a shape is sometimes referred to as a "squirrel cage". As in the first embodiment, fasteners 220 are inserted into mounting holes 615, 616, 617 to securely couple cooling device 600 to constant velocity joint housing 205. Load-distributing portion 605 again distributes loads applied by fasteners 220 to first housing portion 210. Additionally, rotation of constant velocity joint housing 205 results in movement of cooling device 600 attached thereto, with fan blades 620 of fan-blade portion 610 generating air currents depending on the direction of rotation. Specifically, in the view shown in FIG. 4B, clockwise rotation generates air currents that move from constant velocity joint housing 205 toward rear driveshaft 130', as well as air currents that move from fan blades 620 toward the axis of rotation.

Counter-clockwise rotation generates air currents that move away from rear driveshaft 130' and away from the axis of rotation.

Figure 5A:
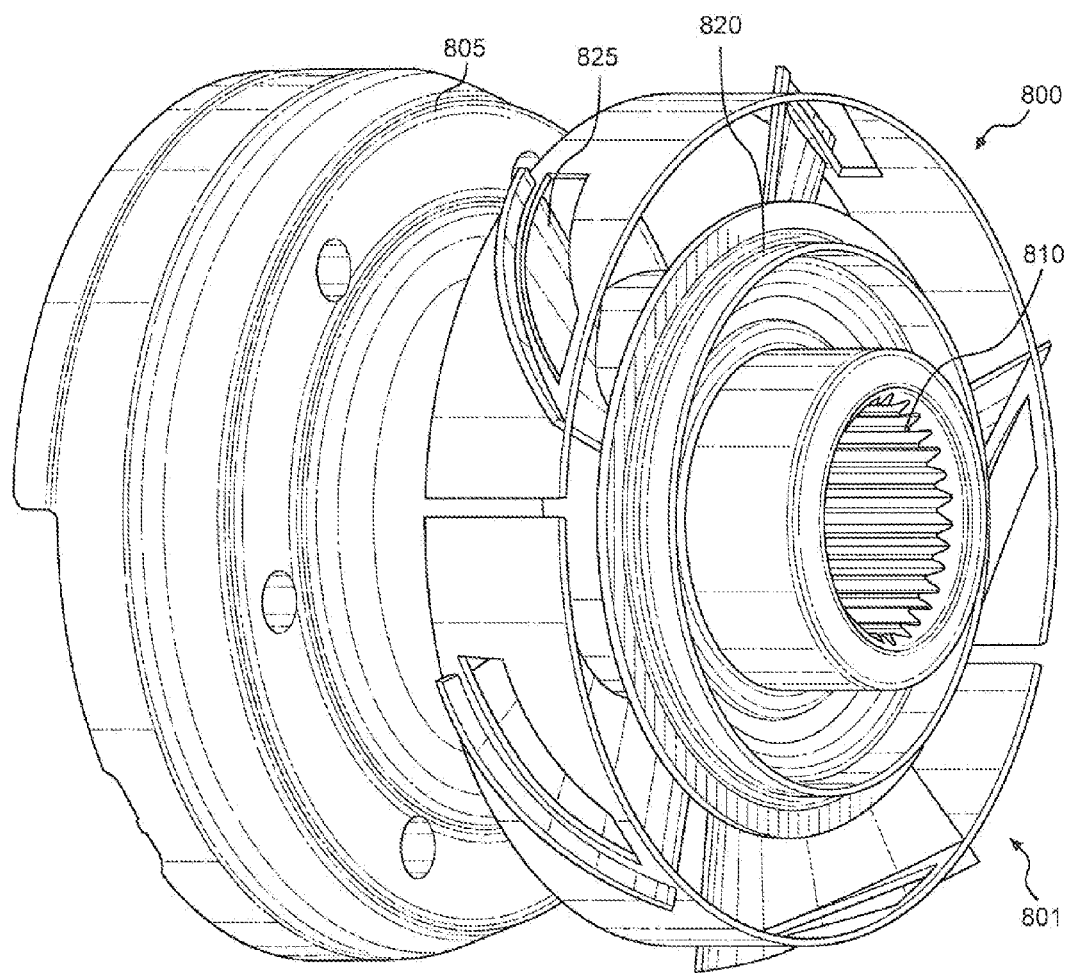
FIGS. 5A-B are perspective views of a cooling system in accordance with a third embodiment of the present invention.
Figure 5B:
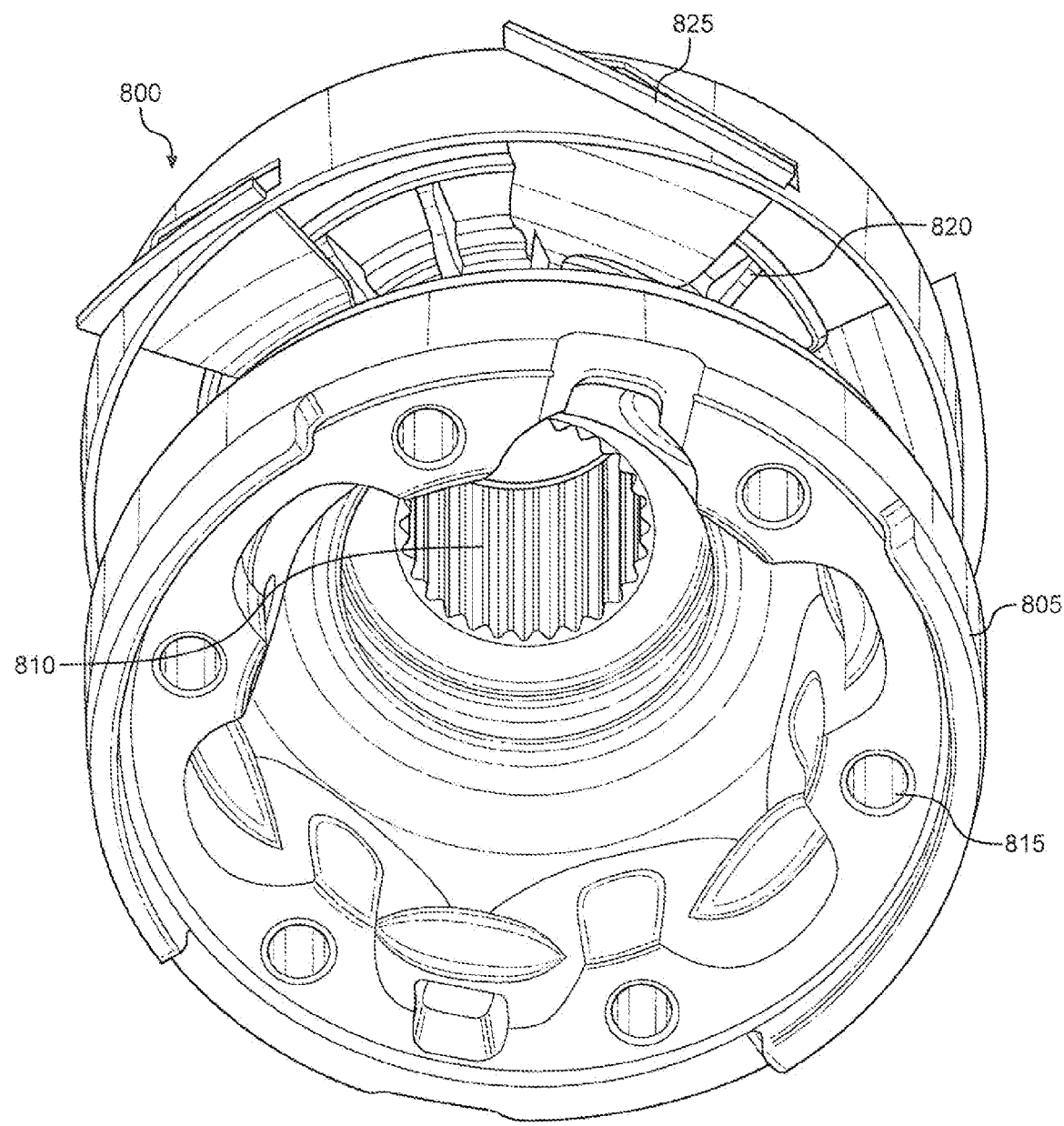

A third embodiment of a cooling device 800 is shown in FIGS. 5A-B. Specifically, there are two cooling devices 800, 801 coupled to an axle flange 805, which has a plurality of internal splines 810 formed thereon. The plurality of splines enables axle flange 805 to be coupled to a second structure having matching splines. In the embodiment shown in FIG. 2, axle flange 805 is located between rear driveshaft 130' and rear differential assembly 150', and splines 810 enable axle flange 805 to be rotatably coupled to a portion of rear differential assembly 150'. Additionally, axle flange 805 has a plurality of mounting holes 815 for coupling axle flange 805 to a third structure, such as constant velocity joint housing 205. In such an embodiment, fasteners 220 extend from constant velocity joint housing 205 and into mounting holes 815. Cooling device 800 includes a coupling portion 820 and a plurality of fan blades 825. Coupling portion 820 enables cooling device to couple to axle flange 805. The plurality of fan blades 825 generates air currents in both radial and axial directions when axle flange 805 rotates. As in the first three embodiments, the specific directions depend on the direction of the rotation of axle flange 805.

Although described with reference to various embodiments, it should be readily understood that various changes or modifications, both major and minor, could be made to the invention without departing from the spirit thereof. For example, varying numbers of cooling devices 400 may be coupled to constant velocity joint housing 205. Similarly, cooling devices 600 may be smaller so that more are needed to form a full circle. Alternatively, less than a full circle of cooling devices 600 may be provided. In addition, fan-blades portions 410, 410', 610 may be other shapes and sizes. Also, fan blade portion 410 may extend past mounting holes 415, 416 or fan-blade portion 610 may have a different number of fan blades 620. In general, the invention is only intended to be limited by the scope of the following claims.

The invention claimed is:

1. A cooling assembly comprising:
   a constant velocity joint including:
      a housing having a first housing portion and a second housing portion; and
      a fastener coupling the first housing portion to the second housing portion; and
   a cooling device including:
      a load-distributing portion located between the fastener and the housing; and
      a fan-blade portion directly coupled to the load-distributing portion, wherein the fan-blade portion is configured to create a current of air when the constant velocity joint is rotated.

2. The cooling assembly of claim 1, wherein the fan-blade portion is formed integrally with the load-distributing portion.

3. The cooling assembly of claim 2, wherein the load-distributing portion distributes a load applied by the head of the fastener to the housing.

4. The cooling assembly of claim 3, wherein the fan-blade portion includes at least two fan blades.

5. The cooling assembly of claim 3, wherein the load-distributing portion includes a mounting hole, and wherein the fastener is inserted into the mounting hole.

6. The cooling assembly of claim 3, wherein the constant velocity joint further includes a second fastener for coupling the first housing portion and the second housing portion, the cooling assembly further comprising a second cooling device including:
   a second load-distributing portion located between a head of the second fastener and the one of the first or second housing portions; and
   a second fan-blade portion directly coupled to the second load-distributing portion.

7. The cooling assembly of claim 1, wherein the constant velocity joint further includes a second fastener coupled to the housing, the cooling assembly further comprising a second cooling device including:
   a second load-distributing portion located between a head of the second fastener and the housing; and
   a second fan-blade portion directly coupled to the second load-distributing portion.

8. A motor vehicle comprising:
   a constant velocity joint including:
      a housing having a first housing portion and a second housing portion; and
      a fastener coupling the first housing portion to the second housing portion; and
   a cooling device including:
      a load-distributing portion located between the fastener and the housing; and
      a fan-blade portion directly coupled to the load-distributing portion, wherein the fan-blade portion is configured to create a current of air when the constant velocity joint is rotated.

9. The motor vehicle of claim 8, wherein the fan-blade portion is formed integrally with the load-distributing portion.

10. The motor vehicle of claim 9, wherein the load-distributing portion distributes a load applied by the head of the fastener to the housing.

11. The motor vehicle of claim 10, wherein the fan-blade portion includes at least two fan blades.

12. The motor vehicle of claim 10, wherein the load-distributing portion includes a mounting hole, and wherein the fastener is inserted into the mounting hole.

13. The motor vehicle of claim 10, wherein the constant velocity joint further includes a second fastener for coupling the first housing portion and the second housing portion, the motor vehicle further comprising a second cooling device including:
   a second load-distributing portion located between a head of the second fastener and the one of the first or second housing portions; and
   a second fan-blade portion directly coupled to the second load-distributing portion.

14. The motor vehicle of claim 8, wherein the constant velocity joint further includes a second fastener coupled to the housing, the motor vehicle further comprising a second cooling device including:
   a second load-distributing portion located between a head of the second fastener and the housing; and
   a second fan-blade portion directly coupled to the second load-distributing portion.

15. A method for providing a cooling air flow in a region of a constant velocity joint, the constant velocity joint including a housing having a first housing portion and a second housing portion and a fastener, the method comprising:
   locating a load-distributing portion of a cooling device between the fastener and the housing while coupling the first housing portion to the second housing portion with the fastener;

distributing, with the cooling device, a load applied to the housing by the fastener;
rotating the constant velocity joint; and
creating a current of air by concurrently rotating the cooling device with the constant velocity joint.

16. The method of claim 15, wherein the cooling device includes a fan-blade portion, and wherein distributing the load applied by the fastener is accomplished by the load-distributing portion.

17. The method of claim 16, wherein creating the current of air is accomplished by the fan-blade portion.

18. The method of claim 17, further comprising:
forming the fan-blade portion integrally with the load-distributing portion.

19. The method of claim 18, wherein the load-distributing portion has a mounting hole, and further comprising:
inserting the fastener into the mounting hole.

20. The method of claim 18, further comprising:
coupling the first and second housing portions with a second fastener;
distributing, with a second cooling device coupled to the housing, a load applied by the second fastener to one of the first or second housing portions; and
creating a current of air by concurrently rotating the second cooling device with the constant velocity joint.

21. The method of claim 15, wherein the constant velocity joint further includes a second fastener coupled to the housing, and further comprising:
distributing, with a second cooling device coupled to the housing, a load applied to the housing by the second fastener; and
creating a current of air by concurrently rotating the second cooling device with the constant velocity joint.

* * * * *